United States Patent [19]

Takitani et al.

[11] 4,442,224
[45] Apr. 10, 1984

[54] CATALYTIC COMPONENT FOR POLYMERIZATION OF α-OLEFIN AND METHOD FOR HOMO- OR CO-POLYMERIZATION OF α-OLEFIN

[75] Inventors: Masaru Takitani; Shizuo Tomiyasu; Keikichi Baba, all of Shinnanyo, Japan

[73] Assignee: Toyo Stauffer Chemical Co., Ltd., Tokyo, Japan

[21] Appl. No.: 386,586

[22] Filed: Jun. 9, 1982

[30] Foreign Application Priority Data

Jun. 11, 1981 [JP] Japan ................... 56-89857

[51] Int. Cl.³ .............................................. C08F 4/64
[52] U.S. Cl. ................................... 502/112; 502/122; 502/123; 502/125; 502/126; 502/127; 502/128; 502/119; 526/125; 526/142; 526/128
[58] Field of Search ........................ 252/429 B
[56] References Cited

U.S. PATENT DOCUMENTS

| | | | |
|---|---|---|---|
| 3,094,568 | 6/1963 | Hay et al. | 252/429 B X |
| 3,755,274 | 8/1973 | Piekarski et al. | 252/429 B X |
| 4,115,319 | 9/1978 | Scata et al. | 252/429 B |
| 4,143,223 | 3/1979 | Toyota et al. | 252/429 B X |
| 4,215,013 | 7/1980 | Loontjens | 252/429 B |
| 4,220,554 | 9/1980 | Scata et al. | 252/429 B |
| 4,242,229 | 12/1980 | Fujuii et al. | 252/429 B |
| 4,252,670 | 2/1981 | Caunt et al. | 252/429 B |
| 4,329,252 | 5/1982 | Gavens et al. | 252/429 B |

FOREIGN PATENT DOCUMENTS 2033409A 5/1980 United Kingdom .

*Primary Examiner*—Patrick Garvin
*Attorney, Agent, or Firm*—Armstrong, Nikaido, Marmelstein & Kubovcik

[57] ABSTRACT

An α-olefin polymerizing catalytic component is obtained by treating, with alcohol and/or phenol, a solid product obtained by allowing an organo-magnesium compound expressed by a generic formula of R'MgX' (wherein R' represents a hydro-carbon group having 1 to 20 carbon atoms and X' a halogen atom selected from the group consisting of chlorine, bromine and iodine or a hydrocarbon group having 1 to 20 carbon atoms) to react with a halogenating agent in the presence of an electron donor; by treating the treated matter with a halogen-containing titanium compound, either after heating under reduced pressure or without such heating; and by treating the product further with a mixture or a complex consisting of an organo-aluminum compound, an organic acid ester and a poly-siloxane. Homo- or co-polymerization of an α-olefin is carried out in the presence of a catalyst system comprising the catalytic component and an organo-aluminum compound.

2 Claims, No Drawings

CATALYTIC COMPONENT FOR POLYMERIZATION OF α-OLEFIN AND METHOD FOR HOMO- OR CO-POLYMERIZATION OF α-OLEFIN

BACKGROUND OF THE INVENTION

This invention relates to a novel catalytic component for α-olefin polymerization which has a higher activity than conventional supported catalytic component of the Ziegler type and is capable of giving a highly stereospecific polymer in combination solely with an organo-aluminum compound and to a method for homo- or co-polymerization (hereinafter will be called (co-) polymerization for short) of an α-olefin in the presence of a catalyst system consisting of the above stated catalytic component and an organo-aluminum compound.

More specifically, the invention relates to an α-olefin polymerizing catalytic component obtained by treating, with alcohol and/or phenol, a solid product which is obtained by allowing an organo-magnesium compound expressed by a generic formula of R'MgX' (wherein R' represents a hydrocarbon group having 1 to 20 carbon atoms and X' a halogen atom selected from the group consisting of chlorine, bromine and iodine or a hydrocarbon group having 1 to 20 carbon atoms) and a halogenating agent to react with each other in the presence of an electron donor; then, by treating the treated product with a halogen-containing titanium compound either after heating it under reduced pressure or without such heating; and by treating the product further with a mixture or complex consisting of an organo-aluminum compound, an organic acid ester and a poly-siloxane. The invention further relates to a method wherein (co-) polymerization of an α-olefin is carried out in the presence of a catalyst system comprising the above stated catalytic component and an organo-aluminum compound.

Catalysts generally in use for the manufacture of stereospecific olefin polymers are of the type known by the name of a Ziegler-Natta catalyst consisting of a transition metal belonging to the groups IV–VI of the periodic table and an organo-metallic compound belonging to the groups I–III of the periodic table.

In the industrial manufacture of an α-olefin polymer such as poly-propylene poly-butene-1, etc., an α-olefin polymerizing catalytic component comprising a titanium trichloride composition as the transition metal belonging to the groups IV–VI of the periodic table or an α-olefin polymerizing catalytic component in which titanium tetra-chloride is supported by a magnesium-containing halide support or an α-olefin polymerizing catalytic component in which titanium tetra-chloride is supported by a support obtained by pulverizing a magnesium-containing halide together with an electron donor has been employed.

However, in order to obtain a highly stereospecific polymer, the use of an α-olefin polymerizing catalytic component other than a titanium trichloride composition generally necessitates use of an electron donor in addition to the α-olefin polymerizing catalytic component and an organo-aluminum compound at the time of polymerization as disclosed in Japanese patent application laid-open publications No. 48-16986 and 55-58207. Besides, as it has been well known, any deviation of the molar ratio of the electron donor to the organo-aluminum compound from an optimum value thereof, even to a slight degree, would bring about an adverse effect on the polymerizing activity and the stereospecificity of a polymer produced. Therefore, with respect to stabilization of the industrial manufacture of an α-olefin polymer, there has been a strong desire for the development of some highly active α-olefin polymerizing catalytic component that is capable of giving a highly stereospecific polymer when used in combination solely with an organo-aluminum compound.

Further, in accordance with the conventional known methods, some residue of the catalyst inevitably remains within the olefin polymer obtained. The residual catalyst presents various problems in terms of the stability, workability, etc. of the olefin polymer. These problems then necessitates provision of some additional facilities for the removal of the residual catalyst and the stabilization of the polymer. This shortcoming of the conventional methods can be obviated by enhancing the polymerizing activity expressed by the weight of the olefin polymer produced per unit weight of the catalyst. Such improvement would obviate the necessity for the facility for removal of the residual catalyst and would thus permit reduction in the cost of production required for the manufacture of an olefin polymer.

In view of this, the present inventors strenuously conducted studies for obtaining an α-olefin polymerizing catalytic component that has a higher degree of polymerizing activity than the above mentioned α-olefin polymerizing catalytic components and is capable of giving an α-olefin polymer excelling in stereospecificity. These studies have led to the present invention.

SUMMARY OF THE INVENTION

It is therefore an object of the invention to provide a supported catalytic component for polymerization of an α-olefin obtained by treating with alcohol and/or phenol, a solid product which is obtained by allowing an organo-magnesium compound expressed by a generic formula of R'MgX' (wherein R' represents a hydrocarbon group having 1 to 20 carbon atoms and X' a halogen atom selected from the group consisting of chlorine, bromine and iodine or a hydrocarbon group having 1 to 20 carbon atoms) and a halogenating agent to react with each other in the presence of an electron donor; then, by treating the treated product with a halogen-containing titanium compound either after heating it under reduced pressure or without such heating; and by treating the product further with a mixture or complex consisting of an organo-aluminum compound, an organic acid ester and a poly-siloxane.

It is another object of the invention to provide a method for (co-) polymerization of an α-olefin wherein the (co-) polymerization of an α-olefin is carried out in the presence of a catalyst system comprising the catalytic component described above and an organo-aluminum compound.

It is a feature of the present invention that the catalytic component must be prepared on the indispensable requisites including to carry out the reaction of the organo-magnesium compound and the halogenating agent in the presence of an electron donor; to have the solid reaction product thus obtained treated with an alcohol and/or a phenol, this being followed by a process of heating the treated product under reduced pressure; then to treat the treated product with a halogen-containing titanium compound; and, after that, to treat the treated product further with a mixture or complex consisting of an organo-aluminum compound, an organic acid ester and a poly-siloxane. The advantages of the invention are as follows: The particles of the catalytic component and those of the polymer obtained therefrom are in good morphology. The catalytic component excels the supported catalytic components of the known prior art both in polymerizing activity and in stereospecific polymer productivity. The shortcoming of the conventional Ziegler type catalytic component using a magnesium compound as a support in respect to the bulk density of the polymer produced can be improved to a great extent in accordance with the present invention. A further salient advantage of the invention resides in that the high stereospecificity polymerization of an α-olefin, with a catalytic component combined solely with an organo-aluminum compound, which heretofore has been extremely difficult now can be accomplished in accordance with the invention. Therefore, stable stereospecific polymerization of an α-olefin can be carried out by using the Ziegler type catalytic component.

The invention will be more clearly understood from the following detailed description:

DETAILED DESCRIPTION OF THE INVENTION

The compoufnd that can be used as electron donor in accordance with the present invention is either a single kind or a mixture of two or more kinds selected from the group consisting of an organic acid ester, an organic ether compound, a poly-siloxane, a thio-ether, organic ketone and an amine. The organic acid ester that can be used as electron donor in accordance with the invention may be selected, in the case of an aliphatic carboxylic acid ester or an aromatic carboxylic acid ester for example, from the group consisting of a primary alkyl saturated aliphatic carboxylate ester such as methyl formate, ethyl acetate, n-amyl acetate, 2-ethyl-hexyl acetate, n-butyl formate, ethyl butyrate, ethyl valerate, etc.; a alkenyl saturated aliphatic carboxylate ester such as vinyl acetate, allyl acetate, etc.; an primary alkyl unsaturated aliphatic carboxylate ester such as methyl acrylate, methyl methacrylate, n-butyl crotonate, etc.; a polycarboxylic acid ester such as 2-ethyl-hexyl adipate, etc.; a lactones such as γ-butyro lactone, δ-valero lactone, etc.; a primary alkyl benzoate ester such as methyl benzoate, ethyl benzoate, n-propyl benzoate, n- or iso-butyl benzoate, n- or iso-amyl benzoate, n-hexyl benzoate, n-octyl benzoate, 2-ethyl hexyl benzoate, etc.; a primary alkyl toluate ester such as methyl toluate, ethyl toluate, n- or iso-butyl toluate, 2-ethyl-hexyl toluate, etc.; an primary alkyl anisate ester such as methyl anisate, ethyl anisate, n-propyl anisate, etc.; a primary alkyl naphthoate ester such as methyl naphthoate, n-butyl naphthoate, 2-ethyl-hexyl naphthoate, etc.; an aromatic lactone such as cumarin, phthalide, etc.; and so on. Among these esters, use of methyl benzoate, ethyl benzoate, methyl toluate, ethyl toluate, methyl anisate, ethyl anisate, methyl naphthoate or ethyl naphthoate is preferable.

The organic ether compound that can be used in accordance with the invention is a compound having an ether bond expressed by a generic formula $R^2OR^3$ (wherein $R^2$ and $R^3$ represent either the same or different hydrocarbon groups each having 1 to 15 carbon atoms), a poly ether having at least two such ether bonds within the same molecule or a cylic ether forming a ring within the ether molecule thereof. More specifically, the organic ether compound may be selected from the group consisting of an aliphatic ether such as ethyl ether, propyl ether, iso-propyl ether, butyl ether, amyl ether, iso-amyl ether, hexyl ether, octyl ether, decyl ether, dodecyl ether, methyl propyl ether, methyl iso-propyl ether, methyl butyl ether, methyl iso-butyl ether, methyl amyl ether, methyl iso-amyl ether, methyl hexyl ether, ethyl propyl ether, ethyl iso-propyl ether, ethyl butyl ether, ethyl iso-butyl ether, ethyl amyl ether, ethyl iso-amyl ether, ethyl hexyl ether, vinyl ether, allyl ether, methyl allyl ether, ethyl vinyl ether, ethyl allyl ether, butyl vinyl ether, etc.; an aromatic ether such as anisole, phenetole, butyl phenyl ether, amyl phenyl ether, methoxy toluene, benzyl ethyl ether, phenyl ether, benzyl ether, phenyl benzyl ether, naphthyl ether, veratrole, etc.; a cyclic ether such as propylene oxide, trimethylene oxide, epoxy butane, dioxane, trioxane, furan, methyl furan, tetra-hydro furan, tetra-hydro pyrane, cineole, etc.; and a polyether such as dimethoxy ethane, diethoxy ethane, dibutoxy ethane, diethylene glycol dimethyl ether, diethylene glycol diethyl ether, diethylene glycol dibutyl ether, methylal, acetal, glycerol ether, crown ether, etc.

The poly-siloxane usable in accordance with the invention is either a siloxane polymer having a repeating unit expressed by a generic formula of

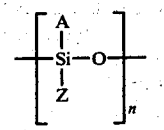

(wherein A and Z represent groups bondable to silicon such as hydrogen, an alkyl group of carbon number 1–8, an aryl group of carbon number not exceeding 10, a halogen, an alkoxyl group of carbon number 1–8, an aryloxy group of carbon number not exceeding 10 or an aliphatic acid residual group of carbon number not exceeding 20; and n represent a number between 3 and 10,000) or a siloxane polymer having two or more kinds of the above stated repeating units distributed in various ratios within the molecule thereof. More specifically, the poly-siloxane may be selected from the group consisting of organic poly-siloxanes including, for example, an alkyl siloxane polymer such as octa-methyl tri-siloxane, octa-ethyl cyclo-tetrasiloxane, dimethyl poly-siloxane, methyl ethyl poly-siloxane, etc.; an aryl siloxane polymer such as hexa-phenyl cyclo-tri-siloxane, diphenyl poly-siloxane, etc.; an alkyl-aryl siloxane polymer such as diphenyl hexa-methyl tetra-siloxane, methyl phenyl polysiloxane, etc.; a halo-alkyl siloxane such as 1,5-dichloro hexa-methyl tri-siloxane, 1,7-dichloro octa-methyl tetra-siloxane, etc.; an alkoxy-siloxane polymer such as dimethoxy poly-siloxane, diethoxy poly-siloxane, etc.; and an aryloxy siloxane polymer such as diphenoxy poly-siloxane.

The thio ether usable in accordance with the present invention is a compound expressed by a generic formula of $R^4SR^5$ (wherein $R^4$ and $R^5$ respectively represent hydrocarbon groups of carbon number 1 to 20). The thio ether may be selected from the group consisting of diethyl thio ether, di-n-propyl thio ether, di-n-butyl thio ether, di-n-amyl thio ether, di-n-hexyl thio ether, di-n-octyl thio ether, di-n-decyl thio ether, methyl phenyl thio ether, ethyl phenyl thio ether, diphenyl thio ether, ditolyl thio ether, dibenzyl thio ether, diallyl thio ether, allyl phenyl thio ether, etc.

The organic ketone usable in accordance with the invention is a compound expressed by a generic formula R⁶COR⁷ (wherein $R^6$ and $R^7$ respectively represent hydrocarbon groups). For example, the hydrocarbon group is an alkyl group of carbon number 1 to 15 such as methyl, ethyl, propyl, butyl, pentyl, octyl, or an aryl group of carbon number not exceeding 15 such as phenyl, tolyl, xylyl, etc., or an aralkyl group of carbon number not exceeding 15 such as benzyl. The organic ketone may be selected from the group consisting of an aliphatic ketone such as acetone, methyl ethyl ketone, dibutyl ketone, dipentyl ketone, dioctyl ketone, etc.; and an aromatic ketone such as aceto-phenone, benzophenone, etc.

The amine usable in accordance with the invention is a compound expressed by a generic formula of

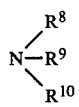

(wherein $R^8$ represents a hydrocarbon group and $R^9$ and $R^{10}$ respectively represent either hydrogen or a hydrocarbon group). The hydro-carbon group is, for example, an alkyl group of carbon number 1 to 15 such as methyl, ethyl, butyl, propyl, octyl, etc.; an aryl group of carbon number not exceeding 15 such as phenyl, tolyl, xylyl, etc.; or an aralkyl group of carbon number not exceeding 15 such as benzyl. More specifically, the amine may be selected from the group consisting of an aliphatic primary, secondary or tertiary amine such as diethyl amine, tri-ethyl amine, n-propyl amine, di-n-propyl amine, tri-n-propyl amine, n-butyl amine, di-n-butyl amine, tri-n-butyl amine, n-octyl amine, di-n-octyl amine, tri-n-octyl amine, etc.; and an aromatic primary, secondary or tertiary amine such as aniline, N-methyl aniline, N,N-di-methyl aniline, di-phenyl amine, tri-phenyl amine, N,N-dimethyl benzyl amine, etc. The usable amines further include compounds having at least two nitrogen atoms of amine within the molecule of them such as tetra-methyl methylene di-amine, ethylene di-amine, tetra-methyl ethylene di-amine, tetra-ethyl ethylene di-amine, etc.

The quantity in which the electron donor compound is to be used varies with the kind of the donor compound. Generally, however, the electron donor is used in quantity at least 0.001 mol against 1 mol of the organo-magnesium compound, preferably more than 0.01 and most preferably 0.1 mol or more. Use of the electron donor compound in quantity less than 0.001 mol hardly gives a usable catalytic component because of low productivity for a stereospecific polymer. Although there is no particular upper limit to the quantity of the donor, use of more than 20 mol of it does not give any salient increase in the effect thereof. It is, therefore, preferable to use the electron donor in quantity not exceeding 20 mol.

The organo-magnesium compound usable in accordance with the invention is expressed by a generic formula R'MgX', wherein R' represents a hydrocarbon group having 1 to 20 carbon atoms while X' represents a halogen atom selected from the group consisting of chlorine, bromine and iodine or a hydro-carbon group having 1 to 20 carbon atoms. More specifically, the organo-magnesium compound may be selected from the group consisting of diethyl magnesium di-n-propyl magnesium, di-iso-propyl magnesium, di-isoamyl magnesium, iso-amyl ethyl magnesium, iso-amyl-n-propyl magnesium, di-n-amyl magnesium, n-amyl-n-propyl magnesium, n-butyl-t-butyl magnesium, n-butyl propyl magnesium, dibutenyl magnesium, di-n-butyl magnesium, n-butyl ethyl magnesium, n-butyl-sec-butyl magnesium, di-t-butyl magnesium, di-sec-butyl magnesium, di-cyclo penta-dienyl magnesium, diphenyl magnesium, di-n-hexyl magnesium, n-hexyl ethyl magnesium, bis-(methyl cyclo-penta-dienyl) magnesium, dihexynyl magnesium, di-cyclo hexyl magnesium, di-benzyl magnesium, bis (phenyl-ethynyl) magnesium, di-cinnamyl magnesium, n-octyl ethyl magnesium, di-n-octyl magnesium, di-n-decyl magnesium, methyl magnesium chloride, methyl magnesium bromide, methyl magnesium iodide, ethynylene magnesium dibromide, vinyl magnesium chloride, vinyl magnesium bromide, ethyl magnesium chloride, ethyl magnesium bromide, ethyl magnesium iodide, allyl magnesium chloride, propenyl magnesium bromide, iso-propenyl magnesium bromide, n-propyl magnesium chloride, n-propyl magnesium bromide, iso-propyl magnesium chloride, iso-propyl magnesium bromide, 1-methyl propenyl magnesium bromide, tetra-methylene magnesium di-bromide, t-butyl magnesium chloride, n-butyl magnesium chloride, sec-butyl magnesium chloride, cyclo-pentadienyl magnesium chloride, cyclo-penta-dienyl magnesium bromide, p-phenylene magnesium di-bromide, phenyl magnesium chloride, phenyl magnesium bromide, styryl magnesium chloride, styryl magnesium bromide, 1-methyl-2,2-diphenyl cyclo-propyl magnesium bromide, amyl magnesium chloride, hexyl magnesium chloride, benzyl magnesium chloride, octyl magnesium chloride, decyl magnesium chloride, etc. Among these organo-magnesium compounds, those preferable with respect to ease of use include n-butyl ethyl magnesium, n-hexyl ethyl magnesium, di-n-hexyl magnesium, n-octyl ethyl magnesium, di-n-octyl magnesium, ethyl magnesium chloride, n-butyl magnesium chloride, n-hexyl magnesium chloride and n-octyl magnesium chloride.

The organo-magnesium compound is dissolved by a solvent and is used in a state of solution. The solvent usable for this purpose is selected from the group consisting of an aliphatic hydrocarbon such as hexane, heptane, kerosine, etc.; an alicyclic hydro-carbon such as cyclo-hexane, methyl cyclo-hexane, etc.; an aromatic hydro-carbon such as benzene, toluene, xylene, etc.; and the organic ether compound and the amine mentioned in the foregoing or a mixture of them.

Next, the halogenating agent to be used in accordance with the invention is a reagent that is capable of replacing the Mg-hydrocarbon group bond of the organo-magnesium compound with an Mg-halogen bond. More specifically, the halogenating agent may be selected from the group consisting of a halo-silane such as silicon tetra-chloride, tri-chloro silane, mono-methyl dichloro silane, dimethyl chloro silane, ethyl dichloro silane, n-propyl chloride silane, vinyl dichloro silane, n-butyl dichloro silane, phenyl dichloro silane, benzyl dichloro silane, allyl dichloro silane, mono-methyl mono-chloro silane, mono-ethyl mono-chloro silane, tri-methyl mono-chloro silane, mono-methyl tri-chloro silane, etc.; an organo-aluminum halide such as diethyl aluminum chloride, ethyl aluminum di-chloride, ethyl aluminum sesqui-chloride, dimethyl aluminum chloride, methyl aluminum di-chloride, methyl aluminum sesqui-chloride, propyl aluminum di-chloride, di-propyl aluminum chloride, etc.; thionyl chloride, a halogenated hydrocarbon or a carbon halide such as chloroform, hexa-chloro ethane, carbon tetra-chloride, carbon tetra-bromide, carbon tetra-iodide, t-butyl chloride, etc.; a metal halide such as $AlCl_3$, $AlBr_3$, $SnCl_4$, $BCl_3$, $SbCl_3$, $ZnCl_2$, etc.; a hydrogen halide such as hydrogen chloride, etc.; and a halogen such as chlorine. Use of chloroform, carbon tetra-chloride or hexa-chloro ethane is preferable in respect of economy, ease of handling and catalytic properties.

In the method for manufacturing a catalytic component according to the present invention, an organo-magnesium compound and a halogenating agent are mixed and allowed to react in the presence of an electron donor. The mixing is effected either by adding the halogenating agent to the organo-magnesium compound, and vice versa, or by mixing them after they are simultaneously added to the above stated hydrocarbon solvent. Generally, the organo-magnesium compound is a viscous matter although the viscosity varies with the kind and concentration thereof. In mixing the organo-magnesium compound with the halogenating agent, therefore, it is preferable to have the halogenating agent added to the former either after diluting the agent with a hydro-carbon or an inert gas or without diluting it.

The concentration of the organo-magnesium compound within the solvent varies with the structure thereof expressed by the generic formula R'MgX', the number of the carbon atoms and the halogen atoms included in the R' and X'. However, the concentration of the organo-magnesium compound within the solvent should not exceed 50 wt %, preferably not exceeding 45 wt % and most preferably not exceeding 40 wt %. Since the organo-magnesium compound is a viscous matter as mentioned above, the use of it in quantity exceeding 50 wt % causes an excessive increase in the viscosity of the solvent in which the organo-magnesium compound is dissolved and thus makes a stirring operation, etc. difficult. Meanwhile, there is no particular lower limit to the concentration. However, in terms of the productivity for the catalytic component, the lower limit is preferably set at 0.1 wt %. Further, it is preferable to allow the organo-magnesium compound to react with the electron donor before mixing the organo-magnesium compound with the halogenating agent. The electron donor compound is either added to the solvent in which the organo-magnesium compound is dissolved or arranged to have the organo-magnesium compound dissolved in the electron donor compound before dilution with the solvent.

The halogenating agent is used for the purpose of replacing the hydrocarbon group of the organo-magnesium compound with halogen atoms. The mixing quantity of the halogenating agent varies with the kind thereof. Generally, however, the halogenating agent is used in quantity from 0.01 to 10 mol for 1 mol of the organo-magensium compound, preferably 0.05 to 5 mol and most preferably 0.1 to 3 mol.

The reaction of the organo-magnesium compound and the halogenating agent may be carried out at any temperature. However, the reaction is vigorous at a high temperature. It is, therefore, desirable to select a relatively low temperature which does not excessively retard the reaction rate. In view of this, the reaction temperature is set at a value between −50° and 100° C., preferably between −30° and 80° C. and most preferably between −20° and 50° C. Further, in order to have the reaction completely carried out, the reaction system is preferably further stirred and mixed over a period of 0.1 to 10 hours, after completion of mixing of the halogenating agent, either at the same temperature or with the reaction temperature raised to a value not exceeding 150° C.

The treatment of the solid reaction product thus obtained with an alcohol and/or a phenol is preferably carried out with one or more kinds of matters selected from the group consisting of an aliphatic hydro-carbon such as hexane, heptane, kerosine, etc.; an alicyclic hydro-carbon such as cyclo-hexane, methyl cyclo-hexane, etc.; and an aromatic hydro-carbon such as benzene, toluene, xylene, etc. In carrying out this treatment, the solid product is suspended in a hydrocarbon solvent. Then, in accordance with the procedure generally practised, the alcohol and/or phenol is added to this either as it is or in a state of having been diluted with a hydro-carbon to an extent within a range from 1 vol % to 100 vol %.

The alcohol to be used in accordance with the invention is either a mono-hydric alcohol expressed by a generic formula of R"OH (wherein R" represents an alkyl, alkenyl or aralkyl group of carbon number 1 to 20) or a poly-hydric alcohol having at least 2 hydroxyl groups. The alcohol is selected from the group consisting of methanol, ethanol, n-propanol, iso-propanol, n-butanol, sec-butanol, t-butanol, n-amyl alcohol, iso-amyl alcohol, hexanol, heptanol, octanol, decyl alcohol, allyl alcohol, vinyl chloride, benzyl alcohol, glycerol, ethylene glycol, propylene glycol, etc.

The phenol to be used in accordance with the invention is selected from the group consisting of phenol, cresol, xylenol, naphthol, butyl hydroxy toluene, chloro phenol, bromo phenol, 2,4,6-tri-chloro phenol, 2,4,6-tri-bromo phenol, 2,4-dinitro phenol, guaiacol, anol, eugenol, iso-eugenol, saligenin, carvacrol, thymol, hydroxy aceto-phenone, hydroxy diphenyl, cyclo-hexyl phenol, catechol, resorcin, hydro-quinone, pyrogallol, hydroxy hydro-quinone, phloro-glucinol, amino phenol, etc.

The length of time required for the treatment with the alcohol and/or phenol varies with the treating temperature and the kind of the alcohol and/or the phenol and is thus not particularly limited. However, the treating length of time is preferably set between 0.1 and 10 hours. The treatment for a length of time than 0.1 hour will not give any effect of treatment with the alcohol and/or phenol. On the other hand, treatment over a period exceeding 10 hours will not give any salient increase in the effect. There is also no particular restriction to the temperature of the treatment. However, if the alcohol and/or phenol remains in a solid state, the treatment would take an excessively long period of time. Besides, in such a case, precipitative adsorption on the surface of the solid product would either come to hamper a subsequent treatment or degrade the catalytic properties obtained. Hence, the treatment must be carried out at least at a temperature above the melting point of the alcohol and/or the phenol employed.

The alcohol and/or phenol is used in quantity generally 0.01 to 10 mol per mol of magnesium existing within the above stated solid product, preferably 0.05 to 5 mol and most preferably 0.1 to 3 mol. The effect attained by the treatment carried out with the alcohol and/phenol chiefly appears in the polymerizing activity and the stereospecific polymer productivity at the time of polymerization of an α-olefin. In the case of catalytic components obtained without carrying out this treatment, the polymerizing activity and the stereospecific polymer productivity tend to become lower and particularly the latter becomes low.

After the solid product has been thus treated with the alcohol and/or phenol, the product (hereinafter will be called the alcohol treated product) is treated with a halogen-containing titanium compound. The treatment may be carried out either after the alcohol treated product has been dried with heating under reduced pressure or without such a preparatory drying process. Hereinafter the alcohol treated solid product which has undergone the drying process carried out with heating under reduced pressure will be called the dried product. The drying process with heating under reduced pressure is carried out over a period of 1 to 10 hours at an absolute pressure not exceeding 500 mmHg and at a temperature between 10° and 100° C. The catalytic properties such as polymerizing activity can be further improved through this drying process.

The treatment with the halogen-containing titanium compound can be carried out in accordance with a known method. For example, it is carried out by allowing the alcohol treated product to be suspended either in the halogen containing titanium compound or in a hydro-carbon solvent having the halogen containing titanium compound dissolved therein in a generally practised manner. In the latter case, however, it is preferable to have a high degree of concentration of the halogen-containing titanium compound. Further, this treatment may be carried out with concomitance of a known electron donor compound there.

The halogen-containing titanium compound that is usable in accordance with the invention may be selected from the group consisting of titanium tetra-chloride, titanium tetra-bromide, titanium tetra-iodide, titanium tri-chloride, a solid solution of titanium tri-chloride and aluminum tri-chloride, ethoxy-titanium tri-chloride, propoxy titanium tri-chloride, butoxy titanium tri-chloride, dibutoxy titanium di-chloride, tri-butoxy titanium mono-chloride, etc. Among these compounds, however, use of titanium tetra-chloride is most preferable.

The halogen-containing titanium compound is used in quantity at least 0.1 mol against 1 mol of magnesium contained in the alcohol treated product or the dried product. The quantity is preferably 1.0 mol or more and most preferably 10 mol or more. The treatment with the halogen-containing titanium compound is normally carried out over a period of 0.1 to 10 hours at a temperature between room temperature and 150° C. After completion of the treatment, solid-liquid separation is carried out either by decantation or filtration. Further, the halogen-containing titanium compound sticking to the surface of the solid thus obtained is washed with a hydro-carbon such as hexane, heptane, kerosine, cyclo-hexane, methyl cyclo-hexane, benzene, toluene, xylene, etc.

The solid product thus treated with the halogen-containing titanium compound (hereinafter will be called the halogen-containing titanium compound treated product) is treated further with a mixture or a complex consisting of an organo-aluminum compound, an organic acid ester and a poly-siloxane.

The organo-aluminum compound to be used for this treatment in accordance with the invention is a compound expressed by a generic formula of $AlR^{12}{}_nX_{3-n}$ (wherein $R^{12}$ represents a hydrocarbon group of carbon number 1 to 20; X a halogen or a hydrogen atom; and n a number of $0 < n \leq 3$). More specifically, the organoaluminum compound may be selected from the group consisting of tri-methyl aluminum, tri-ethyl aluminum, tri-n-propyl aluminum, tri-n-butyl aluminum, tri-iso-butyl aluminum, tri-n-hexyl aluminum, tri-2-methyl-pentyl aluminum, tri-n-octyl aluminum, tri-n-decyl aluminum, diethyl aluminum chloride, di-n-propyl aluminum chloride, diisobutyl aluminum chloride, methyl aluminum sesqui-chloride, ethyl aluminum sesqui-chloride, ethyl aluminum dichloride, iso-butyl aluminum dichloride, diethyl aluminum fluoride, diethyl aluminum bromide, diethyl aluminum iodide, diethyl aluminum hydride, diiso-butyl aluminum hydride, iso-prenyl aluminum, etc.

The organic acid ester and the poly-siloxane usable in accordance with the invention are selected from the organic acid esters and the poly-siloxanes mentioned in the foregoing.

The treatment with the mixture or complex of the organo-aluminum compound, the organic acid ester and the poly-siloxane is preferably carried out in the solvent of the above stated hydro-carbon generally by the following methods: In one method, the halogen-containing titanium compound treated product is suspended within the hydro-carbon solvent. To this is added the mixture or complex of the organo-aluminum compound, the organic acid ester and the poly-siloxane. The mixture or complex is added either as it is or after it has been diluted with a hydrocarbon within a range from 1 vol % to 100 vol %. In another method, the hydro-carbon is first prepared to have the mixture or complex of the organo-aluminum compound, the organic acid ester and the poly-siloxane contained therein and then the halogen-containing titanium compound treated product is added thereto.

The length of time for which the treatment is to be carried out varies with the treatment temperature and no particular limitation is set thereto. However, a preferred length of time for the treatment is 0.1 to 10 hours. Treatment for a length of time less than 0.1 hour hardly gives a sufficient effect of the treatment with the mixture or complex consisting of the organo-aluminum compound, the organic acid ester and the polysiloxane. Treatment over a period exceeding 10 hours does not give any salient increase in the effect attainable. Meanwhile, there is no particular limitation to the temperature of treatment. However, the treatment is preferably carried out at a temperature between 0° and 100° C., because: Treatment at a temperature below 0° C. requires a long period of time for attaining the effect of the treatment while treatment at a value exceeding 100° C. comes to inflict an adverse effect on the catalytic properties.

The quantities of the organo-aluminum compound, the organic acid ester and the poly-siloxane to be used, in molar ratios to 1 mol of the titanium atom existing within the halogen-containing titanium compound treated product, are respectively within ranges from 0.01, 0.001 and 0.001 to 1000, 3000 and 3000; preferably from 0.1, 0.01 and 0.01 to 500, 1500 and 1500; and most preferably from 0.5, 0.05 and 0.05 to 100, 300 and 300. The effect attainable through the treatment with the mixture or complex of the organo-aluminum compound, the organic acid ester and the poly-siloxane chiefly appears in the stereospecific polymer productivity in the polymerization of an α-olefin carried out by using the catalytic component in combination solely with an organo-aluminum compound. In cases where the catalytic component has not undergone this treatment, the polymerization shows a poor productivity for a stereospecific polymer.

The solid product which has undergone this treatment is subjected to a solid-liquid separating process which is carried out either by decantation or by filtration. Then, a washing process is carried out with a hydro-carbon. After the washing process, a catalytic component is obtained either in a slurry like state within the hydro-carbon or in a dried state with a drying process carried out.

The catalytic component thus obtained through the processes described above excels both in uniformity of particle size and in fluidity thereof.

The catalytic component of the present invention can be used for the (co-) polymerization of an α-olefin in combination with an organo-aluminum compound. The organo-aluminum compounds mentioned in the foregoing may be used for the polymerization either singly or in the form of a mixture of two or more kinds of them. For the polymerization, the quantity of the organo-aluminum compound to be added is as follows: With the quantity reduced to the mol number of the aluminum contained in the organo-aluminum compound per mol of titanium contained in the catalytic component, the molar ratio of Al/Ti is preferably arranged to be between 1 and 1000.

For further improvement in the catalytic properties, concomitance of a known electron donating compound is allowable in carrying out the polymerization in accordance with the invention. The quantity of the electron donor compound to be used for this purpose is 0.01 to 3 mol for 1 mol of the organo-aluminum compound, preferably 0.05 to 2 mol and more preferably 0.1 to 1 mol.

The (co-) polymerization may be carried out by one of various processes including: A suspension polymerization process in which an aromatic hydro-carbon such as benzene, toluene, xylene, etc. an aliphatic hydro-carbon such as hexane, heptane, kerosine, etc.; or an alicyclic hydro-carbon such as cyclo-hexane, methyl cyclohexane, etc. is used as solvent. A liquid phase polymerization process in which a liquefied α-olefin is used as solvent. A gas phase polymerization process in which an α-olefin is polymerized in a vapor phase. Further, the (co-) polymerization operation may be carried out either in a continuous operation mode or in a batch operation mode.

The α-olefin that can be (co-) polymerized by using the invented catalytic component is an organic compound expressed by a generic formula of $CH_2=CHR^{13}$ (in which $R^{13}$ represents either hydrogen or a hydrocarbon group having 1 to 6 carbon atoms). Such organic compounds include, for example, ethylene, propylene, butene-1,4-methyl pentene-1, hexane-1, styrene, etc. The molecular weight adjustment in the (co-) polymerization of such an α-olefin can be accomplished by a known method using hydrogen or diethyl zinc.

The (co-) polymerization is carried out at a temperature between 0° and 200° C. and preferably between 40° and 120° C.; and at pressure between normal pressure and 100 atm and preferably between normal pressure and 60 atm.

The polymer obtained by the invented method is of highly uniform particle diameter, has a great bulk density and excels in morphology.

The invention will be understood further in detail with reference to the following description of examples, in which:

The term "polymerizing activity" is indicated by a symbol A; "a heptane insoluble matter" by H.I., "an isotactic index" by I.I.; and "bulk density" by $\rho B$. The definition of these terms are as shown below:

A: The weight (g) of a solid polymer produced per unit time (hr), unit pressure (atm) and unit weight (g) of the catalytic component. That is: (g—polymer/g—catalytic component-hr-atm)

H.I.: A polymer insoluble in n-heptane (g) × 100/solid polymer (g) (%)

I.I.: A polymer insoluble in n-heptane (g) × 100/total polymer produced (g) (%)

$\rho B$: Bulk density (g/ml) of solid polymer produced as measured in accordance with the Method A of ASTM-D-1895-69.

EXAMPLE 1

1. Preparation of the catalytic component 1-1. Reaction of an organo-magnesium compound and a halogenating agent:

Using n-butyl ethyl magnesium as the organo-magnesium compound, 161 ml of an n-heptane solution of n-butyl ethyl magnesium (manufactured by Texas Alkyls Inc. of U.S.A., concentration 0.65 mol/l) was poured into a 300 ml, four necked flask the inside of which had been replaced with dry nitrogen. The solution was cooled down to 0° C. by immersing the flask in a refrigerant. To the solution was added 2.0 ml of ethyl benzoate with stirring. Then, 25 ml of carbon tetrachloride which had been diluted with 75 ml of n-heptane was dropped into the flask. After completion of the dropping of the carbon tetra-chloride, the solution was kept with stirring at 0° C. for 40 minutes, at normal temperature for 40 minutes and at 80° C. over another period of 60 minutes to obtain a solid product.

Next, the solution was allowed to cool down to normal temperature. After that, stirring was stopped to allow the solid product to precipitate. A supernatant liquid was removed by decantation. Following the decantation, 200 ml of n-heptane was again poured into the flask. Then, the stirring, precipitation and decantation processes were respectively repeated five times to wash the solid product.

1-2. Treatment with a phenol:

First, 100 ml of n-heptane was poured into the flask to suspend the above stated solid product therein. While the suspension was kept at 30° C. under a stirring operation, 100 ml of an n-heptane solution in which 5 g of p-cresol was dissolved as phenol was dropped into the suspension. The temperature of the suspension was raised up to 80° C. with stirring and the suspension was thus treated over a period of 2 hours at 80° C. A solid was allowed to precipitate by stopping the stirring operation and a supernatant liquid was removed by decantation. Following this, 200 ml of n-heptane was poured into the flask and the stirring precipitation and decantation processes were repeated five times to wash the treated solid.

1-3. Treatment with titanium tetra-chloride:

First, 150 ml of titanium tetra-chloride was poured into the flask to have the phenol treated solid suspended therein. The temperature of the suspension was raised up to 140° C. with stirring to treat the solid over a period of 2 hours at 140° C. After the treatment, the suspension was allowed to cool down. The solid was allowed to precipitate by stopping the stirring operation. A supernatant liquid was removed by decantation. Following this, 200 ml of n-heptane was poured into the flask. Stirring, precipitating and decantation processes were repeated five times to wash the treated solid.

1-4. Treatment with the mixture or complex of an organo-aluminum compound, an organic acid ester and a poly-siloxane:

For this treatment, 150 ml of n-heptane was poured into the flask to have the titanium tetra-chloride treated product suspended therein. While the suspension was kept under a stirring operation, a mixture which consisted of 10.0 ml of tri-ethyl aluminum, 3.2 ml of ethyl p-anisate and 2.0 g of chain di-methyl poly-siloxane (a product of Shinetsu Silicone Co. called by the trade name of KF 96, of viscosity 100 centistokes, molecular weight of repeating unit 74) and dissolved in 50 ml of n-heptane was dropped into the suspension. The treatment was thus carried out at normal temperature over a period of one hour.

After completion of the treatment, the suspension was subjected to filtration. A cake which was thus obtained was washed with 1 liter of n-heptane and dried at 40° C. for a period of five hours under reduced pressure to obtain a catalytic component.

2. Polymerization of propylene:

The inside of an autoclave of 5 liter content volume was replaced with dry nitrogen. Using this autoclave, 40 mg of the catalytic component, 0.2 ml of di-ethyl aluminum chloride and 0.2 ml of tri-ethyl aluminum were put in the autoclave. Following this, hydrogen was introduced into the autoclave up to hydrogen pressure of 0.4 kg/cm$^2$G. After that, 1.5 kg of liquid propylene was put into the autoclave with pressure.

The autoclave was heated up to inside temperature of 80° C. and then a stirring operation was allowed to begin. The point of time at which the stirring began was considered the start of the polymerization. The polymerization was carried on over a period of two hours while keeping the inside temperature of the autoclave at 80° C. Then, stirring was stopped and at the same time a propylene gas was discharged from the inside of the autoclave. By this, a solid polymer was obtained. The results of the polymerization were: A=362, H.I.=92.8 and $\rho$B=0.41.

EXAMPLES 2 and 3

In each of Examples 2 and 3, a catalytic component was prepared in exactly the same manner as in Example 1 with the exception of that: In the treatment to be carried out with the mixture or complex of an organo-aluminum compound, an organic acid ester and a poly-siloxane, a compound shown in Table 1 was used as the poly-siloxane. Poly-propylene was also polymerized in the same manner as in Example 1. The results of the polymerization were as shown in Table 1 below:

TABLE 1

| Example No. | Poly-siloxane (g) | A (g/g-hr-atm) | H.I. (%) | $\rho$B (g/ml) |
|---|---|---|---|---|
| Example 2 | Methyl hydrogen poly-siloxane 4.0 See Note 1 | 375 | 92.6 | 0.40 |
| Example 3 | Methyl phenyl poly-siloxane 6.0 See Note 2 | 383 | 92.4 | 0.42 |

Note 1:
A product of Shinetsu Silicone Co., called KF 99, 40 cs
Note 2:
A product of Shinetsu Silicone Co., called KF 54, 400 cs

EXAMPLE 4

A catalytic component was prepared and propylene was polymerized in exactly the same manner as in Example 1 except that, in the preparation of the catalytic component, 75 ml of an n-butyl ether solution of n-butyl magnesium chloride (concentration was 1.4 mol/liter) was used as the organo-magnesium compound. The results of the polymerization were: A=345, H.I.=92.6 and $\rho$B=0.40.

EXAMPLES 5-8

In each of Examples 5-8, a catalytic component was prepared and propylene was polymerized in exactly the same manner as in Example 1-4 respectively except that: After the treatment with a phenol, the phenol treated solid was dried at 50° C. over a period of three hours under reduced pressure, at absolute pressure 50 mmHg. The results of the polymerization were as shown in Table 2.

TABLE 2

| Example No. | Preparation of catalytic component | A (g/g-hr-atm) | H.I. (%) | $\rho$B (g/ml) |
|---|---|---|---|---|
| Example 5 | Same as in Example 1 | 442 | 94.3 | 0.41 |
| Example 6 | Same as in Example 2 | 450 | 94.2 | 0.40 |
| Example 7 | Same as in Example 3 | 462 | 94.0 | 0.42 |
| Example 8 | Same as in Example 4 | 416 | 94.2 | 0.40 |

COMPARISON EXAMPLES 1-6

In each of these comparison examples, a catalytic component was prepared and propylene was polymerized in exactly the same manner as in Example 1 with the exception of that the titanium tetra-chloride treated product obtained in accordance with the process carried out in Example 1 was treated with a mixture or a complex consisted of reagents shown in Table 3. The results of the polymerization were as shown in Table 3.

TABLE 3

| Comparison Example No. | A mixture or complex of reagents | A (g/g-hr-atm) | H.I. (%) | $\rho$B (g/ml) |
|---|---|---|---|---|
| 1 | 10.0 ml of TEAL and 2.0 g of DMPS | 252 | 64.5 | 0.37 |
| 2 | 3.2 ml of EPA and 2.0 g of DMPS | 210 | 68.7 | 0.35 |
| 3 | 10.0 ml of TEAL and 3.2 ml of EPA | 245 | 84.7 | 0.38 |
| 4 | 10.0 ml of TEAL | 260 | 52.8 | 0.34 |
| 5 | 3.2 ml of EPA | 228 | 75.3 | 0.37 |
| 6 | 2.0 g of DMPS | 231 | 65.2 | 0.35 |

NOTES:
TEAL: Tri-ethyl aluminum
EPA: Ethyl p-anisate
DMPS: Chain di-methyl poly-siloxane

EXAMPLES 9, 10 and 11

In each of these Examples, a catalytic component was prepared and propylene was polymerized in exactly the same manner as in Example 1 except that, in the treatment with a mixture or complex of an organo-aluminum compound, an organic acid ester and a poly-siloxane, a compound shown in Table 4 was used as the organic acid ester. The results of the polymerization were as shown in Table 4.

TABLE 4

| Example No. | Organic acid ester (ml) | A (g/g-hr-atm) | H.I. (%) | pB (g/ml) |
|---|---|---|---|---|
| Example 9 | EB, 2.0 | 372 | 92.4 | 0.41 |
| Example 10 | EPT, 4.5 | 384 | 92.6 | 0.41 |
| Example 11 | MB, 6.0 | 360 | 92.5 | 0.40 |

NOTES:
EB: Ethyl benzoate
EPT: Ethyl p-toluate
MB: Methyl benzoate

EXAMPLES 12–19

In each of these Examples, a catalytic component was prepared and propylene was polymerized in exactly the same manner as in Example 1 except that, in carrying out the reaction of an organo-magnesium compound and a halogenating agent, a compound shown in Table 5 was employed as concomitant electron donor. The results of the polymerization were as shown in Table 5.

TABLE 5

| Example No. | Electron donor compound (ml) | A (g/g-hr-atm) | H.I (%) | pB (g/ml) |
|---|---|---|---|---|
| Example 12 | anisole, 20 | 375 | 92.3 | 0.40 |
| Example 13 | ethyl p-anisate, 5 | 368 | 92.5 | 0.41 |
| Example 14 | di-ethyl thio-ether, 1.0 | 371 | 92.4 | 0.42 |
| Example 15 | di-n-butyl ether, 30 | 386 | 92.8 | 0.41 |
| Example 16 | acetone, 5 | 360 | 92.2 | 0.40 |
| Example 17 | di-methyl poly-siloxane, 10 | 364 | 92.5 | 0.40 |
| Example 18 | hexyl ether, 15 | 385 | 92.7 | 0.42 |
| Example 19 | di-n-butyl thio-ether, 25 | 374 | 92.4 | 0.41 |

EXAMPLES 20–23

In each of these Examples, a catalytic component was prepared and propylene was polymerized in Exactly the same manner as in Example 1 except that, in carrying out the reaction of an organo-magnesium compound and a halogenating agent, a compound shown in Table 6 was employed as halogenating agent. The results of the polymerization were as shown in Table 6 below:

TABLE 6

| Example No. | Halogenating agent (ml) | A (g/g-hr-atm) | H.I. (%) | pB (g/ml) |
|---|---|---|---|---|
| Example 20 | tri-chloro silane, 10 | 342 | 92.0 | 0.39 |
| Example 21 | SiCl4, 30 | 331 | 92.1 | 0.38 |
| Example 22 | Chloro-form, 20 | 353 | 92.4 | 0.41 |
| Example 23 | t-butyl chloride, 45 | 348 | 92.2 | 0.40 |

EXAMPLES 24–30

In each of Examples 24–30, a catalytic component was prepared and propylene was polymerized in exactly the same manner as in Example 1 except that, in carrying out the treatment with a phenol, an alcohol or a phenol shown in Table 7 was used in place of p-cresol. The results of the polymerization were as shown in Table 7 below:

TABLE 7

| Example No. | Alcohol or phenol | A (g/g-hr-atm) | H.I. (%) | pB (g/ml) |
|---|---|---|---|---|
| Example 24 | ethanol, 6 ml | 345 | 92.0 | 0.39 |
| Example 25 | n-butanol, 4.8 ml | 348 | 92.1 | 0.39 |
| Example 26 | n-octanol, 30 ml | 362 | 92.5 | 0.40 |
| Example 27 | phenol, 1 g + n-octanol, 10 ml | 364 | 92.4 | 0.41 |
| Example 28 | guaiacol, 5 g | 375 | 92.3 | 0.40 |
| Example 29 | 2,4-di-methyl phenol, 10 g | 368 | 92.5 | 0.41 |
| Example 30 | p-chloro phenol, 7 g | 379 | 92.6 | 0.42 |

COMPARISON EXAMPLE 7

A solid product was obtained through a reaction between the organo-magnesium compound and the halogenating agent of Example 1, with the reaction carried out in the same manner as in Example 1. The solid product thus obtained was treated with titanium tetrachloride in the same manner as in Example 1. Then, treatment with the phenol was carried out in the same manner as in Example 1. The phenol treated product was treated with a mixture or complex of the organo-aluminum compound, the organic acid ester and the poly-siloxane in the same manner as in Example 1 to obtain a catalytic component. Using this catalytic component, propylene was polymerized in the same manner as in Example 1 to obtain the following results: A=243, H.I.=67.2 and pB=0.37.

COMPARISON EXAMPLE 8

The phenol treated solid of Example 1 was treated with a mixture or complex of the organo-aluminum compound, the organic acid ester and the poly-siloxane in the same manner as in Example 1. After that, the product thus obtained was treated with titanium tetrachloride to obtain a catalytic component. Then, using this catalytic component, propylene was polymerized in the same manner as in Example 1 to obtain the following results: A=218, H.I.=65.3 and pB=0.38.

COMPARISON EXAMPLE 9

A solid product was obtained through the reaction of the organo-magnesium compound and the halogenating agent in the same manner as in Example 1. The solid product was treated with a mixture or complex of the organo-aluminum compound, the organic acid ester and the poly-siloxane in the same manner as in Example 1. After that, the product was treated with the titanium tetra-chloride in the same manner as in Example 1. Then, a further treatment was carried out with the phenol in the same manner as in Example 1 to obtain a catalytic component. Propylene was polymerized using this catalytic component in the same manner as in Example 1.

The results of the polymerization were: A=208, H.I.=58.5 and pB=0.35.

What is claimed is:

1. A catalytic component for polymerizing an α-olefin, prepared by the following steps:
    (a) reacting an organo-magnesium compound with a halogenating agent in the presence of an electron donor compound at a temperature between −50° C. and 100° C. to obtain a solid product; the organo-magnesium compound being expressed by the formula R'MgX', wherein R' is a hydrocarbon group having 1 to 20 carbon atoms, and X' is a halogen atom selected from the group consisting of chlorine, bromine and iodine or a hydrocarbon group having 1 to 20 carbon atoms;

(b) treating the solid product with at least one of an alcohol and a phenol for at least 0.1 hour at a temperature above the melting point of the at least one of an alcohol and a phenol;

(c) treating the resulting product from step (b) with at least 0.01 mol of a halogen-containing titanium compound, per mol of magnesium in the resulting product from step (b), at a temperature between room temperature and 150° C.; and (d) treating the resulting product from step (c) with a mixture or complex consisting of an organo-aluminum compound, a carboxylic acid ester and a polysiloxane, at a temperature between 0° C. and 100° C.

2. An α-olefin polymerization catalytic component prepared by the following steps:

(a) reacting an organo-magnesium compound with a halogenating agent in the presence of an electron donor compound at a temperature between −50° C. and 100° C. to obtain a solid product; the organo-magnesium compound being expressed by the formula R'MgX', wherein R' is a hydrocarbon group having 1 to 20 carbon atoms, and X' is a halogen atom selected from the group consisting of chlorine, bromine and iodine or a hydrocarbon group having 1 to 20 carbon atoms;

(b) treating the solid product with at least one of an alcohol and a phenol for at least 0.1 hour at a temperature above the melting point of the at least one of an alcohol and a phenol;

(c) treating with resulting product from step (b) with at least 0.01 mol of a halogen-containing titanium compound, per mol of magnesium in the resulting product from step (b), at a temperature between room temperature and 150° C.; and (d) drying the resulting product of step (c) for 1–10 hours at an absolute pressure not exceeding 500 mmHg and at a temperature between 10° C. and and 100° C.; and (e) treating the resulting product from step (d) with a mixture or a complex consisting of an organo-aluminum compound, and carboxylic acid ester and a polysiloxane, at a temperature between 0° C. and 100° C.

* * * * *